United States Patent [19]

Garrod

[11] Patent Number: 4,805,961
[45] Date of Patent: Feb. 21, 1989

[54] SEAT RECLINER LATCH APPARATUS AND METHOD OF UTILIZATION THEREOF

[75] Inventor: Frank O. Garrod, Hudsonville, Mich.

[73] Assignee: General Motors Corporation, Detroit, Mich.

[21] Appl. No.: 208,210

[22] Filed: Jun. 17, 1988

[51] Int. Cl.[4] ............................................. B60N 1/02
[52] U.S. Cl. ..................................... 297/361; 297/355
[58] Field of Search ............... 297/361, 362, 354, 355, 297/377

[56] References Cited

U.S. PATENT DOCUMENTS

| | | | |
|---|---|---|---|
| 3,226,158 | 12/1965 | Strien et al. | 297/361 |
| 3,383,135 | 5/1968 | Posh | 297/361 X |
| 3,427,073 | 2/1969 | Downs et al. | 297/361 |
| 3,443,400 | 6/1969 | Reinhold | 297/362 |
| 4,218,091 | 8/1980 | Webster | 297/361 X |
| 4,685,735 | 8/1987 | McFalls et al. | 297/361 |
| 4,759,587 | 7/1988 | Bucka | 297/361 |

Primary Examiner—Peter A. Aschenbrenner
Attorney, Agent, or Firm—Ernest E. Helms

[57] ABSTRACT

The present invention provides a vehicle seat recliner latch apparatus and method of utilization thereof for adjustably setting the inclination of a seat back pivotally mounted with respect to a seat cushion along a first pivotal axis. The latch includes a sector gear fixed with respect to the seat cushion, an elongated rod having a primary axis, a rod having a first end pivotally mounted with respect to the seat cushion along a second axis generally parallel with the first axis. The rod is pivotally connected with respect to the seat back and the inclination of the seat back is adjusted by changing position of connection of the seat back along the rod. A first link is pivotally connected with the rod and the seat back. The first link also has a geared section in mesh with the sector gear whereby the pivotal connection between the first link and rod translate when the inclination of the seat is adjusted.

7 Claims, 5 Drawing Sheets

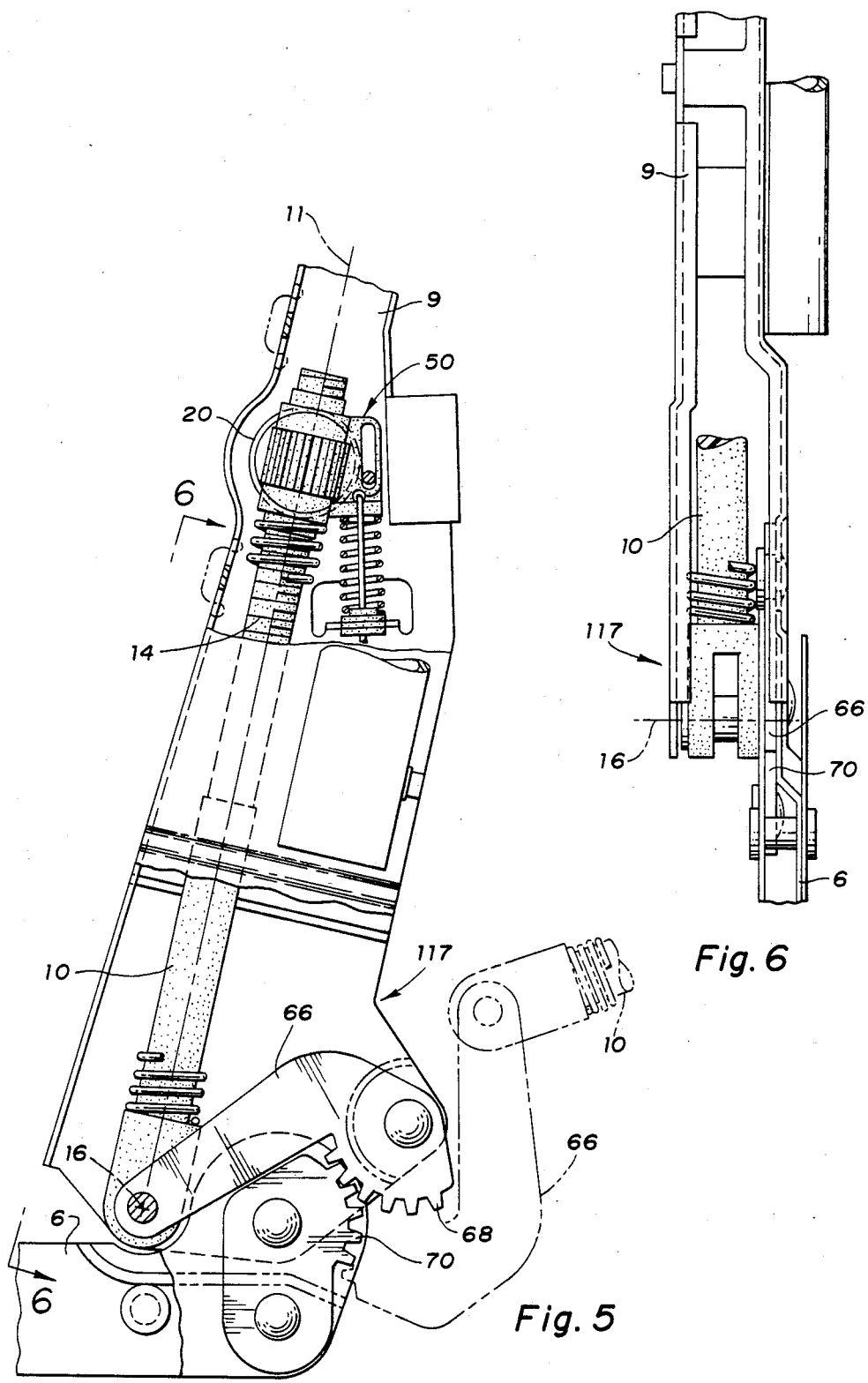

SEAT RECLINER LATCH APPARATUS AND METHOD OF UTILIZATION THEREOF

FIELD OF THE INVENTION

The field of the present invention is that of vehicle seats. More particularly the field of the present invention is that of latches for manual and powered vehicle recliner seats and methods of utilization of the same.

DISCLOSURE STATEMENT

It is known in the art to provide seats with reclining seat backs in automotive vehicles. An example of the above is shown and described in copending U.S. patent application Ser. No. 154,756, filed Feb. 11, 1988 entitled "RECLINING SEAT BACK APPARATUS AND METHOD OF UTILIZATION THEREOF" by Richard W. A. Rees. The disclosure of the Rees invention is incorporated herein. The present invention provides an improvement to the seat adjuster latches of the type shown in the Rees (FIG. 7) invention.

SUMMARY OF THE INVENTION

In the preferred embodiment apparatus of the present invention the vehicle seat recliner latch has a rod which is threaded at one end and is encircled by a sleeve having an outer circumference with gear type teeth. The sleeve is held by bearing members which are pivotally mounted with respect to the seat back. The inclination of the seat is selectively set by restraining rotation of the sleeve on the rod. Additionally, the seat latch has a sector gear which is fixed with respect to the seat cushion. In mesh with the sector gear is a link having a gear tooth section. The link is also pivotally connected with the rod and the seat back. When the inclination of the seat back is adjusted to a new position the pivotal axis of the rod with the link floats in a curvilinear path and the combined structure provides a mechanical advantage which is realized by lowering the locking force needed for restraining rotation of the sleeve on the rod.

The mechanical advantage offered by the present invention allows the rod and sleeve components to be smaller and/or fabricated from more lightweight materials which do not have the strength characteristics of metallic materials.

It is an object of the present invention to provide an apparatus and method of utilization thereof of a seat adjuster latch.

It is an object of the present invention to provide a vehicle seat recliner latch for adjustably setting the inclination of a seat back pivotally mounted with respect to a seat cushion along a first pivotal axis, the latch including a sector gear fixed with respect to the seat cushion, an elongated rod having a primary axis, means to pivotally connect the rod with respect to the seat back along a third pivotal axis and to adjust the position of connection of the seat back along the primary axis of the rod by restraining movement of the seat back with respect to the rod primary axis to set the inclination of the seat back, and a first link pivotally connected with the rod along a second pivotal axis generally parallel to the first pivotal axis and the first link being pivotally connected with the seat back along a forth pivotal axis generally parallel with the first pivotal axis, the first link having a geared section in mesh with the sector gear whereby the second axis translates in a curvilinear path when the inclination of the seat is adjusted.

It is an object of the present invention to provide a powered vehicle seat recliner latch for adjustably setting the inclination of a seat back pivotally mounted with respect to a seat cushion along a first pivotal axis, the latch including a sector gear fixed with respect to the seat cushion, an elongated rod having a threaded portion along a primary axis, a sleeve pivotally connected with the seat back along a third pivotal axis, the sleeve encircling and engaged with the rod along the threaded portion, powered means to cause rotation of the sleeve on the rod to adjust the inclination of the seat back, and a first link pivotally connected with the rod along a second pivotal axis generally parallel to the first pivotal axis and the rod being pivotally connected with the seat back along a forth pivotal axis at a fixed radius with respect to the first pivotal axis, the link having a geared section in mesh with the sector gear whereby the second axis translates in a curvilinear path when the inclination of the seat back is adjusted.

It is an object of the present invention to provide a method for adjusting the inclination of a seat back pivotally mounted with respect to a seat cushion along a first pivotal axis, the method including fixing with respect to the seat cushion a sector gear, pivotally mounting with respect to the seat back along a third pivotal axis generally parallel with the first axis an elongated rod having a primary axis, adjusting the position of connection of the seat back along the primary axis of the rod, and pivotally connecting a first link with a gear section with the rod along a second pivotal axis and pivotally connecting the first link with the seat back along a forth pivotal axis whereby the first link meshes with the sector gear and the second axis translates in a curvilinear path when the inclination of the seat is being adjusted.

Other objects, desires and advantages of the present invention can become more apparent to those skilled in the art as the nature of the invention is better understood from the accompanying drawings and a detailed description.

BRIEF DESCRIPTION OF THE DRAWINGS

FIG. 5 is a sectional view shown mainly in side elevational of a preferred embodiment manual seat adjuster latch according to the present invention;

FIG. 6 is a view taken along line 6—6 of FIG. 5;

DETAILED DESCRIPTION OF THE DRAWINGS

Figure 1:
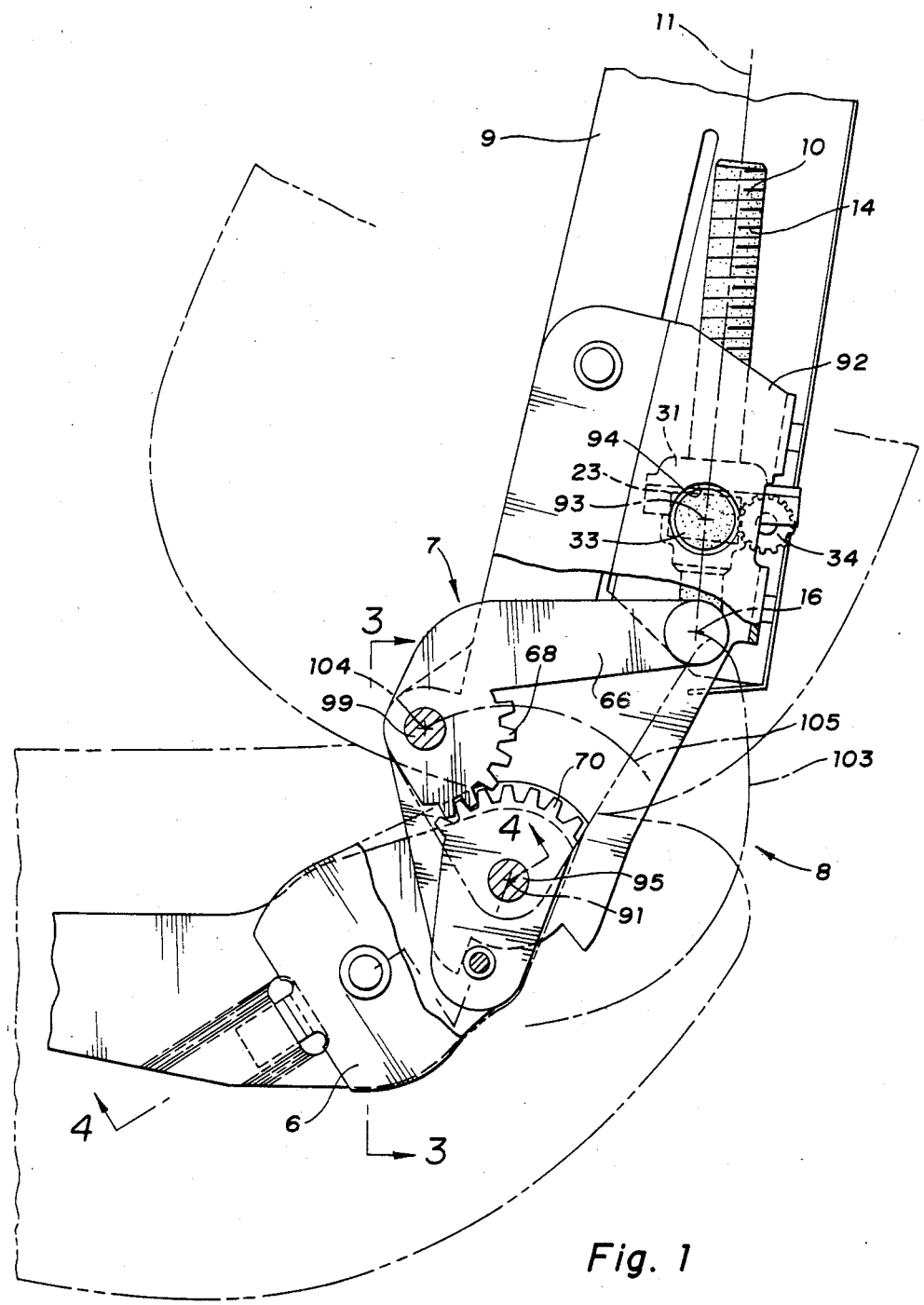
FIG. 1 is a sectional view shown mainly in side elevational of a preferred embodiment powered seat adjuster latch according to the present invention.

Referring to FIGS. 1-4, the seat adjuster latch 7 of the present invention is shown in an environment of a recliner vehicle seat 8. The seat 8 has a seat back 9 with frame members 92. The seat 8 also has a bottom frame hereinafter referred to as the seat cushion 6. The seat back 9 projects generally upward with respect to the is the seat cushion 6. Fixably connected to the seat cushion 6 is a sector gear 70.

The seat back is pivotally mounted with respect to the seat cushion along a first pivotal axis 91. First pivotal axis 91 is colinear with pin 95.

Pivotally mounted with respect to the seat cushion along a translatable second pivotal axis 16 generally parallel to the first pivotal axis 91 is an elongated rod 10. The rod 10 has a primary axis 11 along its length.

The rod 10 has a threaded portion 14 which is threadably engaged and encircled by a sleeve 23. The sleeve 23 is rotatively mounted within housing 31 along an axis coterminous with axis 11. Housing 31 has outward extending tubular projections 33 which pivotally mount the housing 31 into flared apertures 94 the seat back frame members 92. The mounting of he housing 31 provides the means of pivotal connection of the rod 10 with respect to seat back 6 along a third pivotal axis 93.

The above configuration cooperates to set the inclination of the seat back 9. To adjust the inclination of the seat back 9 (FIG. 2), the position of attachment of the seat back 9 with the rod 10 will have to be adjusted with respect to the rod primary axis 11.

To provide the means to change the position of sleeve 23 on rod 10, artificially (electrically) powered helical gear 34 is meshed with sleeve 23. The rod is also pivotally connected with a first link 66. The first link 66 is pivotally connected with the seat back frame 92 along a pin 99 colinear with a forth pivotal axis 104. The first link 66 has a gear tooth section 68 in mesh with the sector gear 70.

Figure 2:
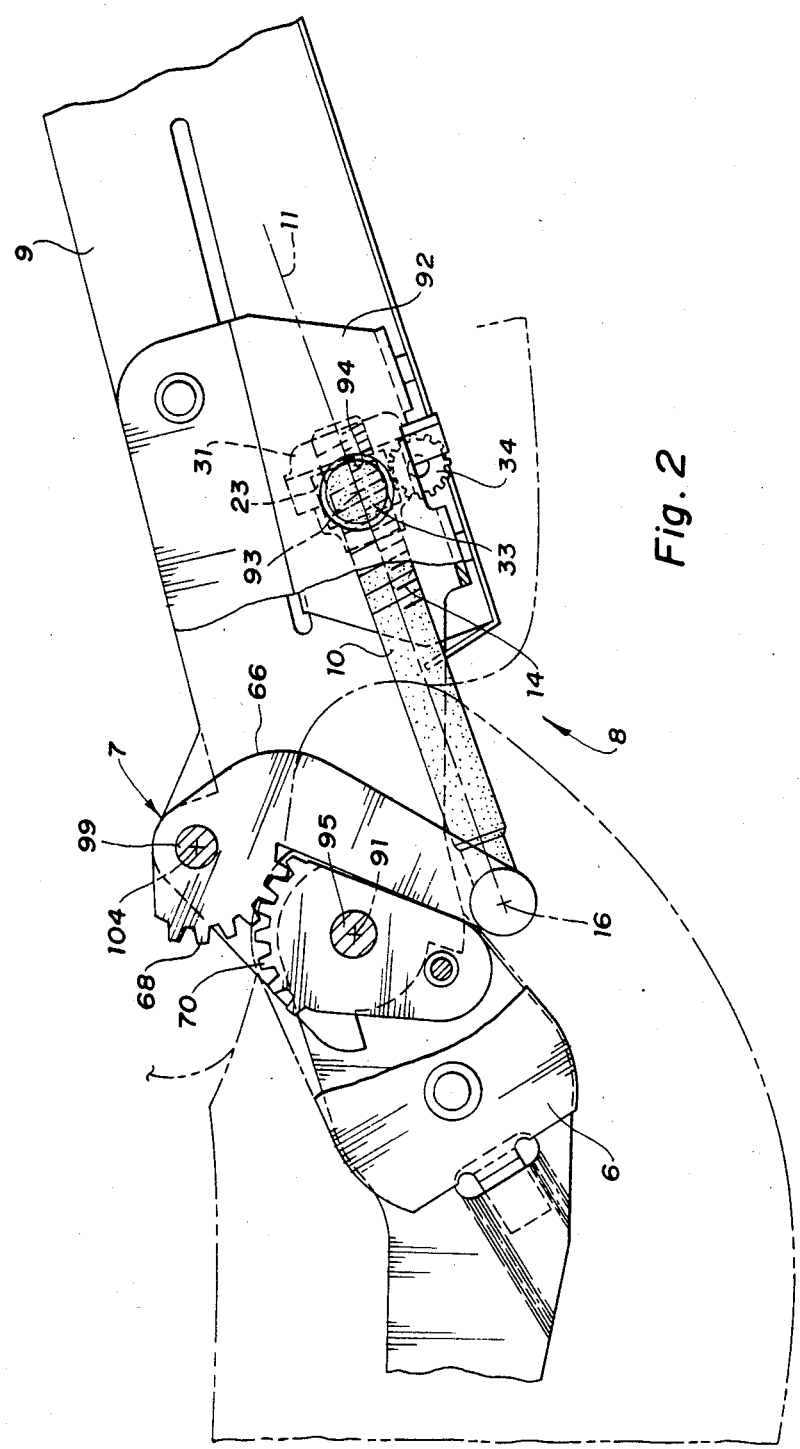
FIG. 2 is a view similar to that of FIG. 1 with the seat in an inclined position.
Figure 3:
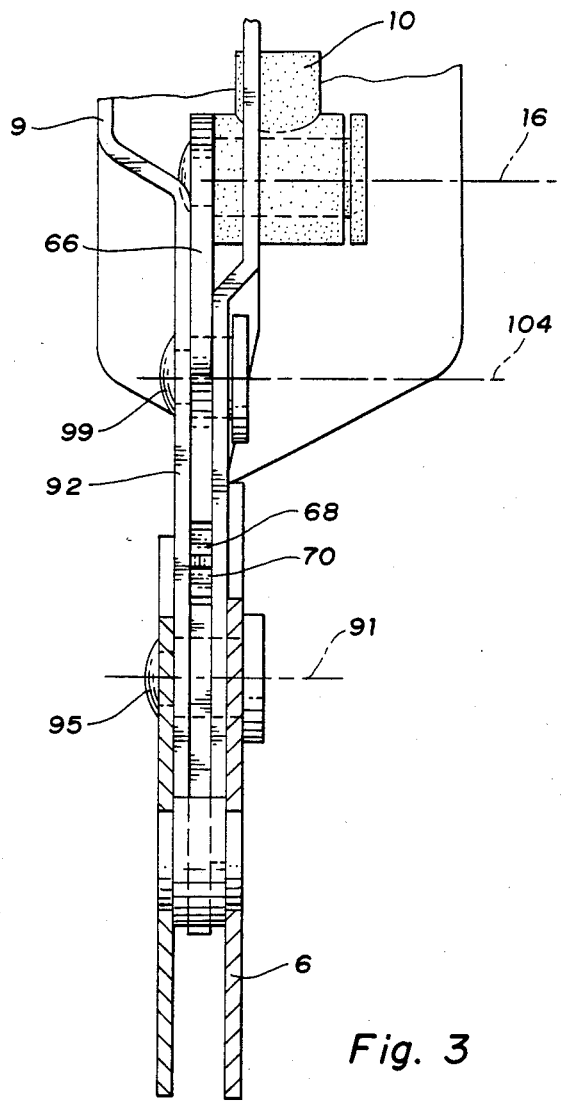
FIGS. 3 and 4 are views taken along lines 3—3 and 4—4 respectively of FIG. 1.
Figure 4:
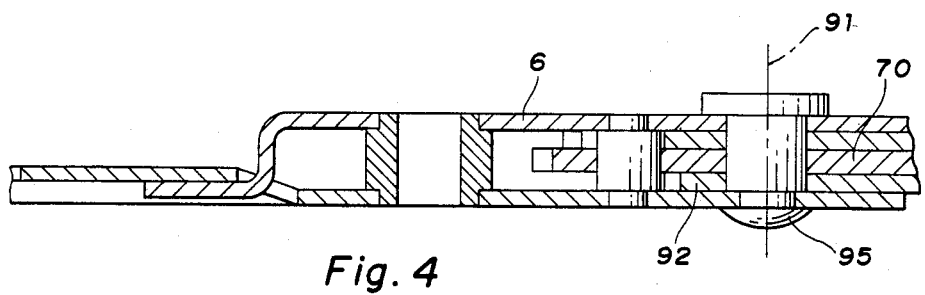
Figure 7:
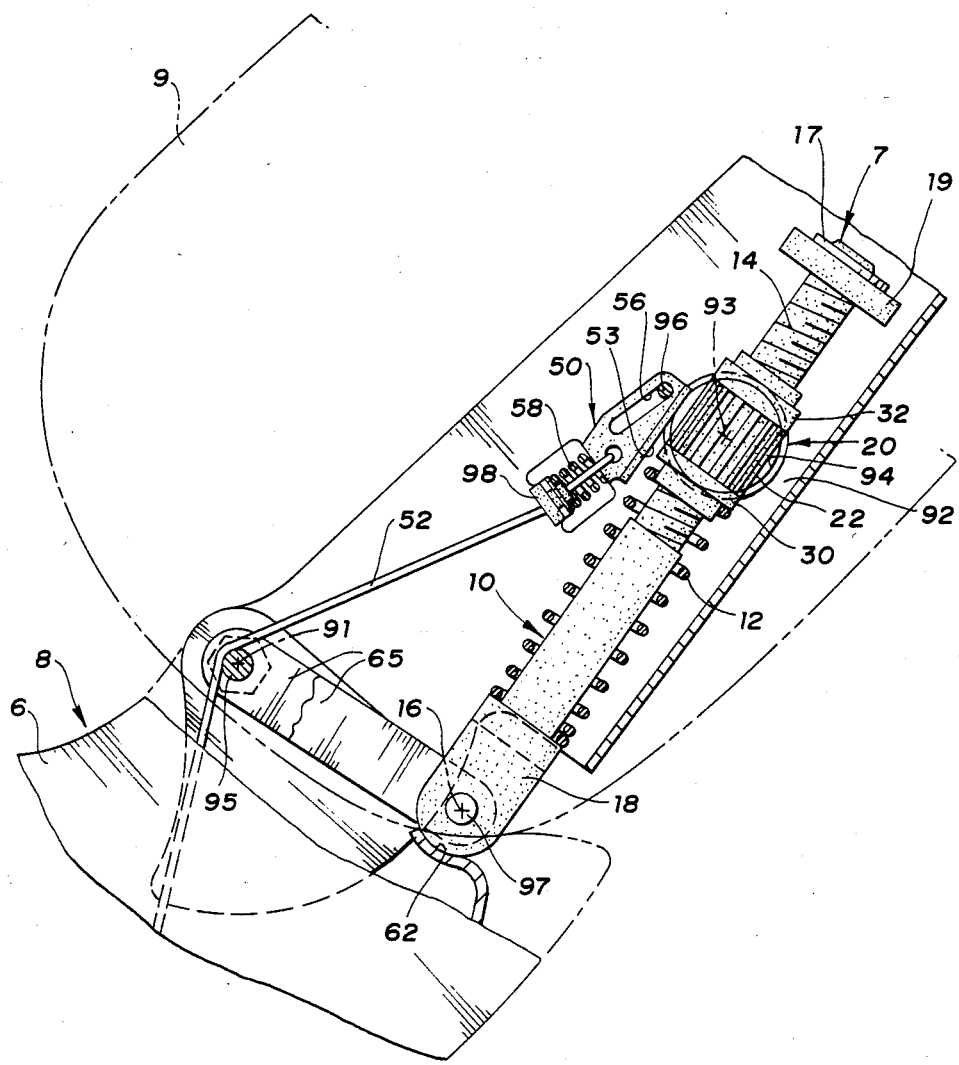
FIG. 7 is a sectional view shown mainly in side elevation of a recliner seat adjuster latch according to Rees invention.

In operation when the seat back 9 is reclined from the position shown in FIG. 1 to the position shown in FIG. 2. The forth pivotal axis is radially fixed with respect to the first pivotal axis 91 therefore forth pivotal axis 104 will translate in a fixed radial path 105 with respect to first axis 91. The first link 66 will rotate in mesh with the sector gear 70 causing the second pivotal axis 16 to translate along curvilinear path 103 which is non-radially fixed with respect to first pivotal axis 91. The translation of the second pivotal axis 16 provides a mechanical advantage in lowering the force needed restraining rotation of sleeve 23 when the seat back 9 is held stationary in a newly desired position. The mechanical advantage also decreases the force needed to rotate the sleeve 23 to effect adjustment of seat back 9. Therefore the sleeve 23 and rod helical gear 34 components can be fabricated from smaller and/or lighter weight materials.

Referring additionally to FIGS. 5 and 6 an alternative preferred embodiment of the present invention is provided for a manual seat latch 117. Similar items are give like reference numerals. The seat latch 117 is provided with a sleeve 20 and a slider release mechanism 50 similar to that shown and described in Rees. The seat latch 117, however, differs from the recliner seat latch 7 in that the first link 66 in the upright position is rearward of the primary axis 11 of the rod 10.

The present invention provides a method for adjusting the inclination of a seat back 9 pivotally mounted with respect to a seat cushion 6 along a first pivotal axis 91, the method including the following steps:

1. Fixing with respect to the seat cushion 6 a sector gear 70.
2. Pivotally mounting with respect to the seat back 9 along a third pivotal axis 93 generally parallel with the first axis an elongated rod 10 having a primary axis 11.
3. Adjusting the position of connection of the seat back 9 along the primary axis 11 of the rod 10.
4. Pivotally connecting a first link 66 with a gear section 6 with the rod 10 along a second pivotal axis 16 and pivotally connecting the first link 66 with the seat back 9 along a forth pivotal axis 104 whereby the first link 66 meshes with the second gear 70 and the second axis 16 translates in a curvilinear path when the inclination of the seat is being adjusted.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle seat recliner latch for adjustably setting the inclination of a seat back pivotally mounted with respect to a seat cushion along a first pivotal axis, said latch in combination comprising:

a sector gear fixed with respect to said seat cushion;

an elongated rod having a primary axis;

means to pivotally connect said rod with respect to said seat back along a third pivotal axis and to adjust the position of connection of said seat back along said primary axis of said rod by restraining movement of said seat back with respect to said rod primary axis to set the inclination of said seat back; and a first link pivotally connected with said rod along a second pivotal axis generally parallel to said first pivotal axis and said first link being pivotally connected with said seat back along a forth pivotal axis generally parallel with said first pivotal axis, said first link having a geared section in mesh with said sector gear whereby said second axis translates in a curvilinear path when the inclination of said seat is adjusted.

2. A vehicle seat recliner latch as described in claim 1, wherein said forth pivotal axis translates in a path with a fixed radius with respect to said first pivotal axis when the inclination of said seat is adjusted.

3. A vehicle seat recliner latch as described in claim 1 wherein said means to pivotally connect said rod with respect to said seat back includes a threaded rod encircled by a sleeve having outer gear teeth with a slider connected with said seat back to selectively engage with said gear teeth of said sleeve to incrementally restrain movement of said seat back with respect to said rod primary axis.

4. A vehicle seat recliner latch as described in claim 1 wherein said means to pivotally connect said rod with respect to said seat back includes a threaded rod encircled by a sleeve and means to artificially power said sleeve to rotate upon said rod to set the inclination of said seat.

5. A vehicle seat manual recliner latch for adjustably setting the inclination of a seat back pivotally mounted with respect to a seat cushion along a first pivotal axis, said latch in combination comprising:

a sector gear fixed with respect to said seat cushion;

an elongated rod having a primary axis with an exterior threaded section;

a sleeve pivotally connected with said seat back along a third pivotal axis, said sleeve being threadably engaged with and encircling said rod;

means to selectively restrain rotation of said sleeve on said rod to set the inclination of said seat back; and a first link pivotally connected with said rod along a second pivotal axis generally parallel to said first pivotal axis and said rod being pivotally connected with said seat back along a forth pivotal axis at a fixed radius with respect to said first pivotal axis, said first link having a geared section in mesh with said sector gear whereby said second axis translates in a curvilinear path when the inclination of said seat is adjusted.

6. A powered vehicle seat recliner latch for adjustably setting the inclination of a seat back pivotally mounted with respect to a seat cushion along a first pivotal axis, said latch in combination comprising:

a sector gear fixed with respect to said seat cushion;

an elongated rod having a threaded portion along a primary axis;

a sleeve pivotally connected with said seat back along a third pivotal axis, said sleeve encircling and engaged with said rod along said threaded portion;

powered means to cause rotation of said sleeve on said rod to adjust the inclination of said seat back; and a first link pivotally connected with said rod along a second pivotal axis generally parallel to said first pivotal axis and said rod being pivotally connected with said seat back along a forth pivotal axis at a fixed radius with respect to said first pivotal axis, said link having a geared section in mesh with said sector gear whereby said second axis translates in a curvilinear path when the inclination of said seat back is adjusted.

7. A method for adjusting the inclination of a seat back pivotally mounted with respect to a seat cushion along a first pivotal axis, said method in combination comprising:

fixing with respect to said seat cushion a sector gear;

pivotally mounting with respect to said seat back along a third pivotal axis generally parallel with said first axis an elongated rod having a primary axis;

adjusting the position of connection of said seat back along the primary axis of said rod; and pivotally connecting a first link with a gear section with said rod along a second pivotal axis and pivotally connecting said first link with said seat back along a forth pivotal axis whereby said first link meshes with said sector gear and said second axis translates in a curvilinear path when the inclination of said seat is being adjusted.

* * * * *